Patented Apr. 28, 1925.

1,536,032

UNITED STATES PATENT OFFICE.

ALBERT L. STILLMAN, OF PLAINFIELD, NEW JERSEY, ASSIGNOR TO THE SMELTERS' GENERAL BRIQUETTE CORPORATION, OF NEW YORK, N. Y., A CORPORATION OF NEW YORK.

PROCESS OF FORMING LOOSE MATERIALS INTO COHERENT BODIES.

No Drawing.    Application filed October 3, 1922. Serial No. 692,165.

*To all whom it may concern:*

Be it known that I, ALBERT L. STILLMAN, a citizen of the United States of America, and a resident of Plainfield, county of Union, State of New Jersey, have invented certain new and useful Improvements in Processes of Forming Loose Materials into Coherent Bodies, of which the following is a specification.

My present invention relates to briquetting and like processes for the forming of loose material into coherent bodies. The method is applicable for various purposes among which I will name particularly the making of briquettes from blast furnace flue dust and from phosphate rock (apatite).

When blast furnace flue dust is to be briquetted according to my method, this material should be fresh so that it will contain a percentage of FeO sufficient to secure the characteristic chemical reaction hereinafter more fully set forth. This percentage is about ten per cent although a content of FeO as low as 7% is sufficient. If blast furnace flue dust is allowed to stand for any length of time it will gradually become oxidized and will then not contain enough FeO to make it suitable for treatment according to my present process. My invention enables such blast furnace flue dust to be inexpensively formed into coherent bodies and particularly into small blocks or briquettes for charging it back into the blast furnace. Ordinarily blast furnace flue dust, if charged back into the blast furnace, will prove detrimental to the operation since it will clog and impede the blast and finally "riding" the blast it will emerge again at the top of the blast furnace without being reduced by the operation.

According to my invention, when applied to blast furnace flue dust, I cause the formation of iron sesqui-oxide in the flue dust, which sesqui-oxide acts as a binder or cement. The production of such sesqui-oxide is accomplished by mixing with the flue dust a corrosive acid agent which reacts with the FeO, or with such part thereof as is necessary to accomplish the result, to produce the said sesqui-oxide $Fe_2O_3$. The reaction is stimulated by means of pressure, said pressure also serving to agglomerate the mass into blocks or briquettes.

In detail I may proceed as follows: The flue dust is mixed in any suitable apparatus, for instance in a pug-mill or horizontal paddle mixer, with an aqueous solution of a corrosive agent which may be any acid capable of bringing about the change of the FeO to $Fe_2O_3$, for instance, hydrochloric acid, sulphuric acid, carbolic acid, etc. Instead of the acids I may employ the metallic salts of such acids, for instance, green vitriol (iron sulphate), chloride of magnesium, and others. It will be understood that the flue dust should contain approximately ten per cent of ferrous oxide FeO. I may by the same method briquette other loose materials containing ten per cent or more of ferrous oxide, for instance, iron ores of that composition.

If the corrosive agent consists of green vitriol I prefer to use a solution of ten parts of crystals in ninety parts of water and to add this solution to the flue dust or other material containing FeO in the proportion of ten parts of solution to ninety parts of loose material. A reaction begins at once between the ferrous oxide and the iron sulphate and this action may be stimulated if desired by rolling the mixture after it leaves the pug-mill or other mixing apparatus, in a grinding apparatus, especially a Chilean mill or edge-runner, which rolling action improves the final product but is not essential to my process. The mixture having been rolled or not is then passed into a rotary press having rolls with accurately faced pockets which serve to shape the mixture into blocks or briquettes. In these pockets the mixture is subjected to a sequence of pressures equal to a steady pressure of from three thousand to six thousand pounds per square inch. The reaction which has been going on all the time is much stimulated by this pressure and when the briquettes drop from this press they are hot and steaming, but the reaction is by no means complete and continues after the briquettes have left the press. The action of the press also serves to permeate the mixture thoroughly with the cementing medium, that is to say, with the $Fe_2O_3$ formed by the reaction.

This reaction which, as stated above, begins as soon as the iron sulphate solution is mixed with the loose material, and continues during and after the briquetting operation, may be explained as follows:—In the presence of water the ferrous oxide and the iron sulphate react with each other to form sulphuric acid and ferrous hydrate as may be expressed by the following equation:

(1) $FeO + FeSO_4 + 3H_2O = H_2SO_4 + 2Fe(OH)_2$

The ferrous hydrate reacts with water to form ferric hydrate as may be expressed by the equation:—

(2) $Fe(OH)_2 + H_2O = Fe(OH)_3 + H$

The reaction is accompanied by the evolution of heat and under the influence of such heat the ferric hydrate is decomposed into iron sesqui-oxide and water vapor as expressed by the equation:

(3) $2Fe(OH)_3 + heat = Fe_2O_3 + 3H_2O$

The water vapor escapes chiefly after the briquettes have left the press, and the iron sesqui-oxide forms a cement or binder to hold the loose material together so that coherent bodies or briquettes will be formed. The sulphuric acid formed by the reaction as expressed in equation 1 reacts with the ferrous oxide to form ferrous hydrate and iron sulphate which may be expressed by the equation:

(4) $H_2SO_4 + 2FeO = Fe(OH)_2 + FeSO_4$

It will be noted that the reaction is cyclical and results in the formation of iron sulphate. Of course the several reactions represented by the above equations take place practically at the same time. They would continue indefinitely were it not for the fact that the water is gradually driven off by the heat evolved. With the passing of the water the acid radical takes up sufficient iron present to satisfy it, that is to say at the end of the reaction the iron sulphate is present in the same quantity and condition as at the beginning.

The cementing action of the iron sesqui-oxide is exerted even during the mixing operation but is quite feeble unless pressure be exerted immediately thereafter, that is to say while the reaction is still going on between the loose material and the corrosive agent.

When the briquettes leave the press they are relatively weak and should, therefore, be preferably cushioned as they are delivered from the press. The reaction still continues for some time after the briquettes have been discharged from the press and the hardening or setting of the briquettes will take place upon simply exposing them to the air. However, for economical reasons it is desirable to hasten this hardening process and this I can accomplish by exposing the briquettes to a very gentle air current for a period of forty-five minutes or over. The simplest way of effecting this is to spread the briquettes as they come from the press on a wide, slowly travelling belt which carries them for forty-five minutes or more at a rate just fast enough to insure a continuous air circulation in and around the hot and drying briquettes. At the end of forty-five minutes the briquettes have set sufficiently to allow their being loaded in cars or bins without danger of their crumbling or breaking, and in such cars or bins the final setting will take place.

As a rule, I prefer to make the briquettes as small as is consistent with the operation for which they are required (about five ounces will be satisfactory in most cases).

Various modifications may be made without departing from the nature of my invention as set forth in the appended claims, for example, the percentage of FeO content of the flue dust as hereinbefore set forth may be varied considerably, but it is essential that an appreciable amount of such FeO be present, at least an amount sufficient to form a large enough quantity of $Fe_2O_3$ as a binder to insure the coherence of the loose material when it is pressed into briquettes.

I claim:

1. The herein described method which consists in mixing with loose material containing an appreciable amount of iron oxide (FeO), a corrosive acid medium that will produce $Fe_2O_3$ as a binder by reacting with said material, and forming the mixture into coherent bodies by rolling pressure while such reaction is going on.

2. The herein described method which consists in mixing with blast furnace flue dust containing an appreciable amount of FeO, a corrosive acid medium that will produce a binder by converting FeO into $Fe_2O_3$, and forming the mixture into coherent bodies by pressure while such conversion is going on.

3. The herein described method which consists in mixing with loose material to be formed by pressure into coherent bodies, said material containing an appreciable amount of FeO a corrosive acid medium that will produce a binder by reacting with said material, forming the mixture into coherent bodies by pressure while such reaction is going on, and then exposing such bodies to a gentle current of air.

4. The method of forming briquettes which consists in adding to loose material containing an appreciable amount of iron oxide (FeO), a medium which will produce a binder by an exo-thermic reaction with said oxide to form iron sesqui-oxide ($Fe_2O_3$), subjecting the mixture to pressure while such reaction is going on to form such mixture into briquettes and employing the heat generated by the reaction to dry the briquettes so formed.

In testimony whereof, I have hereunto set my hand.

ALBERT L. STILLMAN.